United States Patent
Campeanu et al.

(10) Patent No.: US 9,541,930 B2
(45) Date of Patent: Jan. 10, 2017

(54) SYSTEM AND METHOD FOR REDUCING POWER CONSUMPTION IN A POWER SUPPLY CIRCUIT

(75) Inventors: Ron Campeanu, Dungay (AU); Laurence Gonano, Narangba (AU)

(73) Assignee: ECRTech Holdings Pty Ltd, Dungay, New South Wales (AU)

( * ) Notice: Subject to any disclaimer, the term of this patent is extended or adjusted under 35 U.S.C. 154(b) by 261 days.

(21) Appl. No.: 14/127,836

(22) PCT Filed: Jun. 29, 2012

(86) PCT No.: PCT/AU2012/000780
§ 371 (c)(1),
(2), (4) Date: Jul. 30, 2014

(87) PCT Pub. No.: WO2013/000034
PCT Pub. Date: Jan. 3, 2013

(65) Prior Publication Data
US 2014/0340057 A1 Nov. 20, 2014

(30) Foreign Application Priority Data

Jun. 29, 2011 (AU) ................................ 2011902560
Nov. 30, 2011 (AU) ................................ 2011904992

(51) Int. Cl.
*G05F 1/24* (2006.01)
*G05F 1/253* (2006.01)
(Continued)

(52) U.S. Cl.
CPC ................ *G05F 1/253* (2013.01); *H02M 5/12* (2013.01); *G05F 1/24* (2013.01); *H01F 29/02* (2013.01); *Y02B 70/00* (2013.01)

(58) Field of Classification Search
CPC ............ G05F 1/24; G05F 1/247; G05F 1/253; G05F 1/14; G05F 1/147; G05F 1/30; G05F 1/12; G05F 1/26; Y02B 70/00; Y02B 70/30; Y02B 70/32; Y02B 70/3216; Y02B 70/3208
See application file for complete search history.

(56) References Cited

U.S. PATENT DOCUMENTS 3,155,894 A * 11/1964 Bell .......................... G05F 1/13
323/258
3,530,369 A * 9/1970 Thompson ............. G05B 1/025
323/258
(Continued)

OTHER PUBLICATIONS

PCT/AU2012/000780 International Search Report, May 1, 2013, 8 pages.

*Primary Examiner* — Harry Behm
(74) *Attorney, Agent, or Firm* — Duane Morris LLP (57) ABSTRACT

A system for reducing power consumption in a power supply circuit including: a transformer including: a core; a first winding including a first end and a second end of a first wire wound on the core; a second winding including a first end and a second end of a second wire, wherein the second wire has a larger cross-section than the first wire and the second end of the first wire is connected to the first end of the second wire; an input electrically connecting the first and second windings to the power supply circuit; and an output for connecting to a load; and a controller connected to the transformer for controlling an output voltage at the output, wherein the output voltage is less than a supply voltage at the input, to reduce the power consumption of the load.

11 Claims, 8 Drawing Sheets

(51) Int. Cl.
*H02M 5/12* (2006.01)
*H01F 29/02* (2006.01)

(56) References Cited

U.S. PATENT DOCUMENTS

| | | | | |
|---|---|---|---|---|
| 3,621,374 A | * | 11/1971 | Kettler | G05F 1/30 323/343 |
| 3,748,570 A | * | 7/1973 | Martner | H01F 38/18 323/329 |
| 6,417,651 B1 | * | 7/2002 | Kronberg | G05F 1/14 323/255 |
| 6,664,771 B2 | * | 12/2003 | Scoggins | H02P 13/06 323/257 |
| 2005/0024027 A1 | * | 2/2005 | McVicar | H05B 41/42 323/255 |
| 2010/0039090 A1 | | 2/2010 | Sykes | |

* cited by examiner

SYSTEM AND METHOD FOR REDUCING POWER CONSUMPTION IN A POWER SUPPLY CIRCUIT

CROSS-REFERENCE TO RELATED PATENT APPLICATIONS

The present application is a U.S. national stage application under 35 U.S.C. §371 of PCT Application No. PCT/AU2012/000780, filed Jun. 29, 2012, which claims priority to Australian patent application no. 2011902560, filed Jun. 29, 2011, and Australian patent application no. 2011904992, filed Nov. 11, 2011, the entireties of which are incorporated herein by reference.

FIELD OF THE INVENTION

This invention relates generally to a system and method for reducing power consumption in a power supply circuit, and in particular for substantially adjusting a supply voltage, and consequently supply power, relative to an internal load and an external voltage

BACKGROUND OF THE INVENTION

Reducing the amount of electrical power consumed by electrical devices is becoming increasingly important, not only for cost considerations, but also due to environmental pressures. Furthermore, reducing the amount of power consumed reduces the strain on electrical infrastructure, such as electrical transmission lines and generation facilities One way of reducing the amount of electrical power consumed by electrical devices is to reduce the voltage and current supplied to them. Most electrical devices operate normally within a supply voltage range which can be less than the nominal supply voltage. For example many devices which are designed to operate at 230 Vac work normally at voltages as low as 210 Vac. Thus reducing the supply voltage to an electrical device will often reduce the amount of power consumed. Although there may be a slight reduction in performance, such as a slight reduction in brightness of incandescent lighting and a slight reduction in the speed of a motor, in most circumstances the performance reduction is not noticeable to the user.

Various voltage control systems exist that utilise a combination of transformer-based technology and electronic switching devices such as Silicon Controlled Rectifiers (SCR), Pulse-Width Modulators (PWM) and Insulated Gate Bipolar Transistors (IGBT). However all of these technologies are expensive and create a minor interruption in the supply voltage as a result of their break-before-make technology. If the supply voltage is interrupted in this fashion, overload conditions may occur in the electrical device.

Limitations of standard E and I auto-transformers in an energy reduction scenario are a direct result of their inherent design. Auto-transformers, being fixed-ratio, non-isolating transformers, in their generic design are not capable of ensuring a fixed range of voltage output in an environment with fluctuating input voltage. Therefore, E and I auto-transformers are not ultimately suitable for widespread applications in energy reduction solutions.

Another device used for voltage control is a variac. Variacs provide a facility that is not necessary for use in energy reduction technology, being that they allow for their rated current at a wide range of voltages (typically 0 to 260V). Clearly any voltage below 205V is inappropriate for use in normal mains power, as an under voltage scenario may occur and risk damage to equipment. Variacs may be useful in laboratory testing for example, however are an impractical and prohibitively expensive solution for some other applications which require only an isolated range of voltage. In addition, variacs that are rated for use at 50 amps for example are extremely heavy and are typically oil cooled.

US patent application no 2010/0039090 discloses a voltage compensation circuit, for increasing a voltage to a load to compensate for a voltage drop in a supply voltage, and a method of bypassing the circuit. This is achieved by varying the number of windings on the transformer. However, this circuit will not be able to handle large currents when controlling the voltage to a home of factory for example. Furthermore, the circuit will not reduce a power consumption in a load.

There is therefore a need for an improved system and method for reducing power consumption in a power supply circuit.

The reference to any prior art in this specification is not, and should not be taken as, an acknowledgement or any form of suggestion that the prior art forms part of the common general knowledge in Australia or elsewhere.

OBJECT OF THE INVENTION

It is an object, of some embodiments of the present invention, to provide consumers with improvements and advantages over the above described prior art, and/or overcome and alleviate one or more of the above described disadvantages of the prior art, and/or provide a useful commercial choice.

SUMMARY OF THE INVENTION

In one form, although not necessarily the only or broadest form, the invention resides in a system for reducing power consumption in a power supply circuit including:
  a transformer including:
  a core;
  a first winding including a first end and a second end of
    a first wire wound on the core;
  a second winding including a first end and a second end
    of a second wire, wherein the second wire has a larger
    cross-section than the first wire and the second end of
    the first wire is connected to the first end of the second
    wire;
  an input electrically connecting the first and second
    windings to the power supply circuit; and
  an output for connecting to a load; and
  a controller connected to the transformer for controlling an output voltage at the output, wherein the output voltage is less than a supply voltage at the input, to reduce the power consumption of the load.

Preferably, the core, the first winding and the second winding form an autotransformer.

Preferably, the output is at a junction of the second end of the first wire and the first end of the second wire.

Preferably, the transformer further includes a variac to control the output voltage.

Preferably a first end of a winding of the variac is connected to a neutral line of the power supply circuit.

Preferably, a second end of the winding of the variac is connected to the output of the transformer.

Preferably, an output of the variac is connected to a first end of the first winding.

Preferably, a second end of the second winding is connected to an active line of the power supply circuit.

Preferably, the core is an iron core.

Optionally, the core is linear in shape.

Optionally, the core is toroidal in shape.

Optionally, the core is and E and I core.

Optionally, the first winding is wound on a separate core to the second winding.

Optionally, the second winding is on a same core as the first winding.

Preferably, the controller includes a voltage sensor circuit for detecting a voltage at the output of the transformer.

Preferably, the voltage sensor circuit includes one or more comparators for comparing a voltage at the output of the transformer to the upper voltage limit and the lower voltage limit.

Optionally the voltage control system further includes a remote sensor circuit connected to the controller, for monitoring a voltage at a remote device connected to the load.

Suitably, the controller adjusts the output voltage of the transformer such that the voltage at the remote device is between the lower voltage limit and the upper voltage limit.

In another form, the invention resides in a method of reducing power consumption in a power supply circuit including the steps of:
connecting an input of a transformer to the power supply circuit and connecting an output of the transformer to a load, the transformer including:
a core;
a first winding including a first end and a second end of a first wire wound on the core;
a second winding including a first end and a second end of a second wire, wherein the second wire has a larger cross-section than the first wire and the second end of the first wire is connected to the first end of the second wire;
an input electrically connecting the first and second windings to the power supply circuit; and
an output for connecting to a load
wherein an output voltage at the output is variable between a lower voltage limit and an upper voltage limit; and
controlling the output voltage, such that the output voltage is less than a supply voltage, to reduce the power consumption of the power supply circuit.

In yet another form, the invention resides in a system for reducing power consumption in a power supply circuit including:
a transformer including:
a core;
a first winding including a first end and a second end of a first wire wound on the core;
a second winding including a first end and a second end of a second wire, wherein the second wire has a larger cross-section than the first wire and the second end of the first wire is connected to the first end of the second wire;
an input electrically connecting the first and second windings to the power supply circuit;
an output for connecting to a load; and
a control arm in electrical communication with the second winding and the output, wherein the control arm is moveable between an upper position limit and a lower position limit for controlling an output voltage at the output between a corresponding lower voltage limit and an upper voltage limit; and a controller operatively connected to the transformer controlling the output voltage, such that the output voltage is less than a supply voltage, to reduce the power consumption of the load.

Preferably, the output voltage is restricted to a voltage range, defined by the lower voltage limit and the upper voltage limit at all times, regardless of a volt-drop due to load changes or a fluctuating supply voltage.

Preferably, the second winding is wound substantially over the first winding.

Preferably, the control arm extends between the output and the second winding.

Preferably, the control arm is mechanically prevented from being in contact with the first windings.

Preferably, the control arm is electrically prevented from being in contact with the first windings.

Preferably, the transformer includes a motor operatively connected to the control arm for controlling a position of the control arm between the upper position limit and the lower position limit.

Preferably, the core is an iron core.

Optionally, the core is linear in shape.

Optionally, the core is toroidal in shape.

Optionally, the core is an E and I core.

Preferably, the first winding and the second winding of a toroidal transformer are separated on the core.

Optionally, the first winding is on a separate core as the second winding.

Optionally, the first winding is on a same core as the second winding.

Optionally, the second wire has a same cross-section as the first wire.

Preferably, the controller includes a voltage sensor circuit for detecting a voltage at the output of the transformer.

Preferably, the voltage sensor circuit includes one or more comparators for comparing a voltage at the output of the transformer to the upper voltage limit and the lower voltage limit.

Preferably, the voltage control system further includes a remote sensor circuit connected to the controller, for monitoring a voltage at a remote device connected to the load.

Suitably, the controller adjusts the output voltage of the transformer such that the voltage at the remote device is between the lower voltage limit and the upper voltage limit.

In another form, the invention resides in a method of reducing power consumption in a power supply circuit including the steps of:
connecting an input of a transformer to the power supply circuit and connecting an output of the transformer to a load, the transformer including:
a core;
a first winding including a first end and a second end of a first wire wound on the core;
a second winding including a first end and a second end of a second wire wherein the second wire has a larger cross-section than the first wire and the second end of the first wire is connected to the first end of the second wire; and
a control arm in electrical communication with the second winding and the output, wherein the control arm is moveable between an upper position limit and a lower position limit for controlling an output voltage at the output of the transformer between a corresponding lower voltage limit and an upper voltage limit; and
controlling the output voltage, such that the output voltage is less than a supply voltage, to reduce the power consumption of the power supply circuit.

BRIEF DESCRIPTION OF THE DRAWINGS

An embodiment of the invention will be described with reference to the accompanying drawings in which.

DETAILED DESCRIPTION OF THE PREFERRED EMBODIMENT

Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element from another element without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention. It will be appreciated that the invention may be implemented in a variety of ways, and that this description is given by way of example only.

Figure 1:
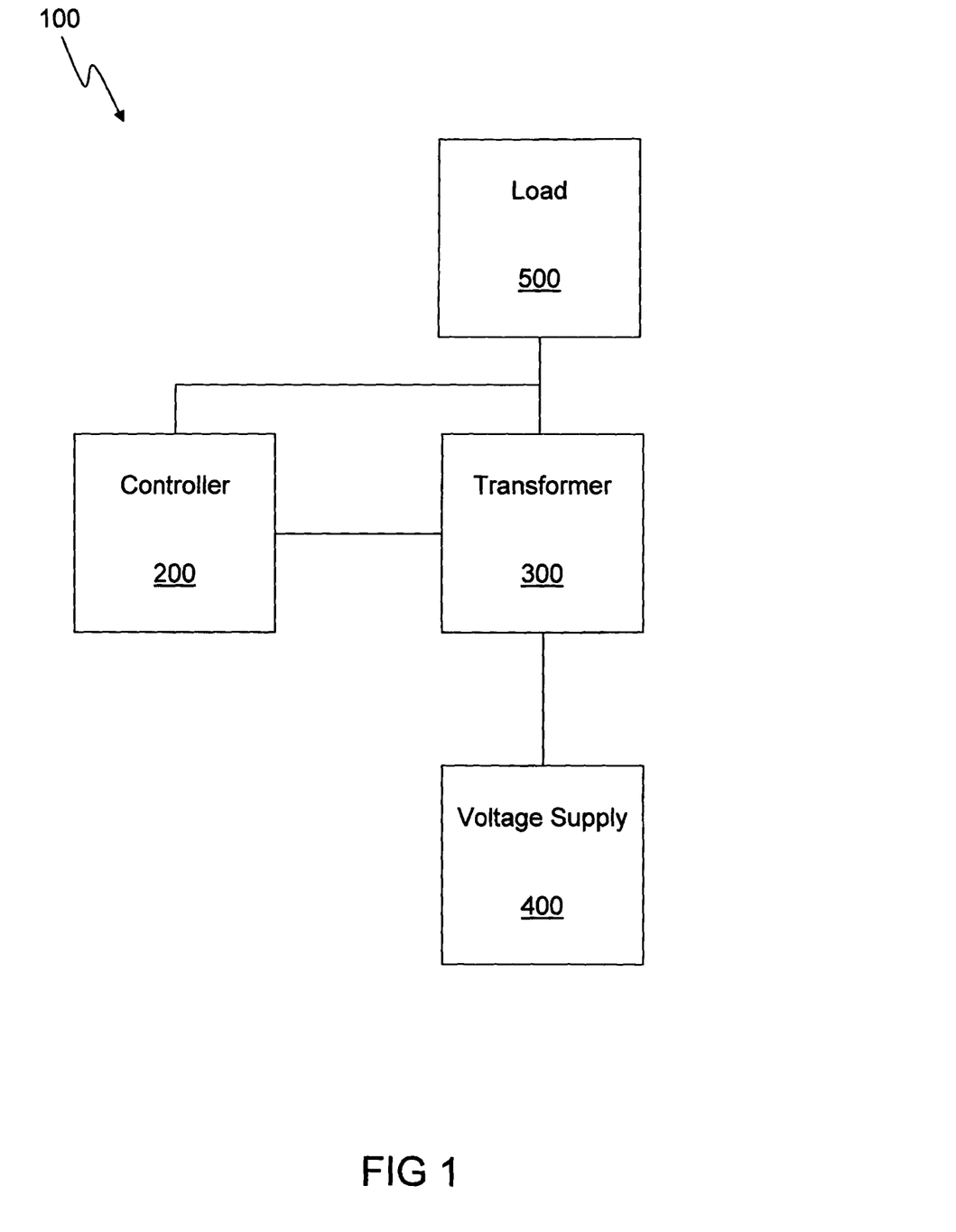
FIG. 1 is a block diagram illustrating a system for reducing power consumption in a power supply circuit according to an embodiment of the present invention.

FIG. 1 is a block diagram showing a system 100 for reducing power consumption in a power supply circuit, according to some embodiments of the present invention. The voltage control system 100 includes a controller 200 connected to an transformer 300. An input of the transformer 300 is connected to a voltage supply 400, such as a 230 Vac single phase supply. An output of the transformer 300 is connected to a load 500, such as a circuit breaker box of a house or factory. The controller 200 monitors an output voltage of the transformer 300 and adjusts the output voltage to within an upper voltage limit and a lower voltage limit. For a 230 Vac supply, the output voltage may be adjusted to between a lower voltage limit of 219 Vac and an upper voltage limit of 225 Vac.

One advantage of reducing the voltage supplied to the load 500, is that power savings may be made. This is because many devices connected to the load 500 will consume less power when the voltage is reduced.

In some embodiments, the transformer 300 is either a linear transformer or a toroidal transformer.

Figure 2:
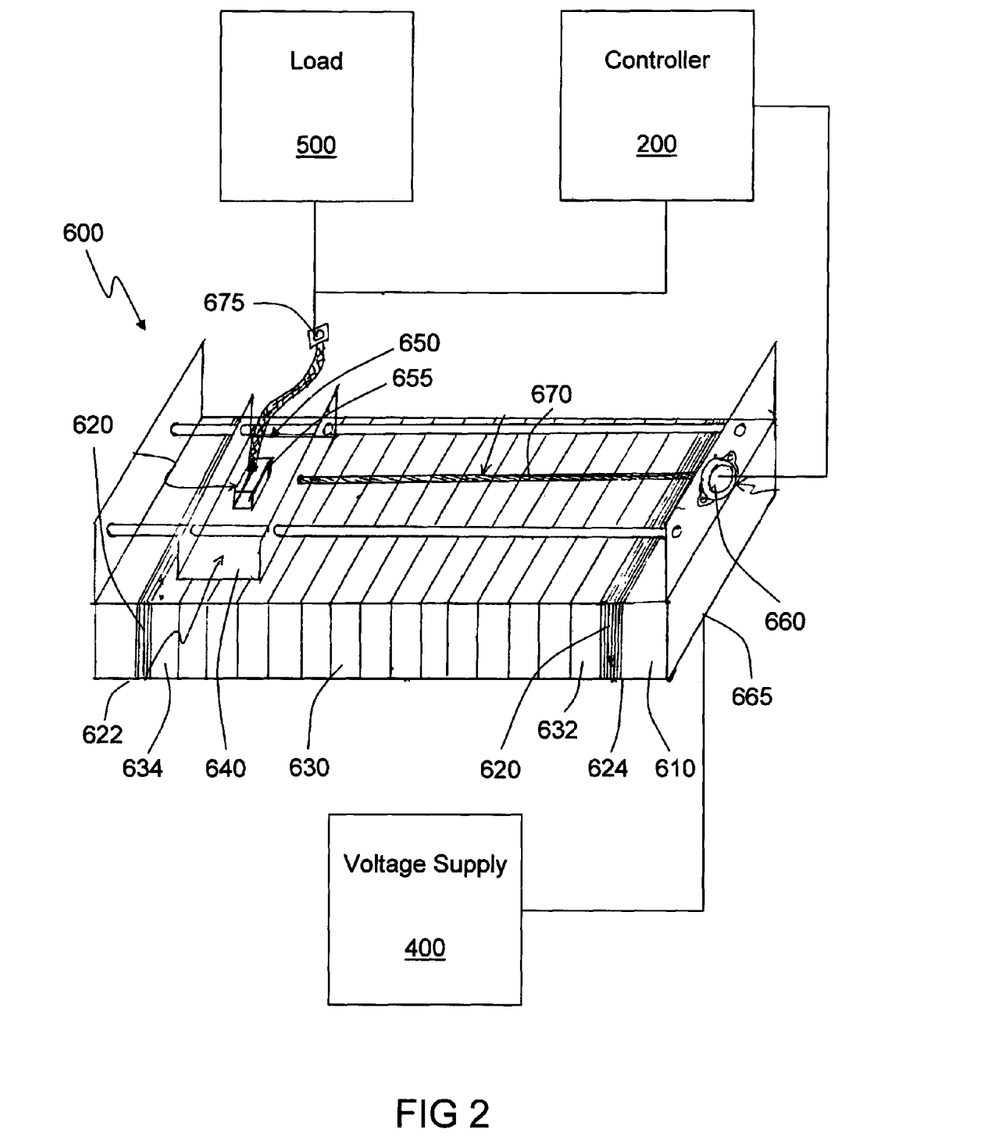
FIG. 2 is a partial cut-away perspective view of a linear transformer according to an embodiment of the present invention.

FIG. 2 shows a partial cut-away perspective view of a linear transformer 600 according to an embodiment of the present invention. The linear transformer 600 includes a core 610, a first winding 620 including a first end 622 and a second end 624 wound around the core 610, a second winding 630 including a first end 632 and a second end 634 wound over the first winding 620, a carriage 640 supporting a control arm 650, a motor 660 and a sliding mechanism 670. The second end 624 of the first winding 620 is connected to the first end 632 of the second winding 630 to form a single continuous winding.

In FIG. 2, the second winding 630 has been cut-away for clarity to show the first winding 620 under the second winding 630. In practice, the second winding 630 extends over the first and second ends 622, 624 respectively, of the first winding.

The control arm 650 includes a carbon brush 655 for making contact with the second winding 630. An input 665 of the transformer 600 is connected between the first end 622 of the first winding 620 and the second end 634 of the second winding 630. An output 675 of the transformer 600 extends from the control arm 650 and the first end 622 of the first winding 620.

The core 610 is an iron core of rectangular cross section or any other suitable cross-section. It should be appreciated however that the core may be made of other materials such as grain-oriented silicon steel, an amorphous material or any other suitable material. Furthermore, the core may be a wound core of wire of a suitable cross section.

A cross-section, or cross-sectional area, of the wires of the first winding 620 is smaller than a cross-section, or cross-sectional area, of the wires of the second winding 630. The first winding 620 is wound around the core 610 and the second winding 630 is wound over the first winding 630. As previously mentioned, the second end 624 of the first winding 620 is connected to the first end 632 of the second winding 630 to form a single continuous winding. It should be appreciated that a cross-section of the windings 620, 720 is chosen to suit the application based on a power rating.

Ends of the second winding 630 define upper and lower position limits of the control arm 650.

In one embodiment, the first winding 620 may be made from a wire of round cross-section, 1.6 mm in diameter, and the second winding 630 may be made from a wire of rectangular cross-section with dimensions of 8 mm wide and 3 mm thick. However it should be appreciated that other wires of other suitable dimensions may be used. It should also be appreciated that the second winding 630 may be made from multiple layers of metal or a compressed powdered material to form the wire, Using this arrangement may magnify the magnetic field in the coil of the wire.

A person skilled in the art will realise that the windings may be made from a Litz wire. A Litz wire is where more than one wire of the same gauge are twisted together to provide a path for heavier currents as well as aiding Electromagnetic Interference (EMI) performance, as the twisted wires act as a choke. In addition to reduced EMI, a Litz wire provides a better frequency response.

In another embodiment, only a single winding is used of the larger cross-section wire used to form the second winding 620. This single winding forms a complete winding on a toroidal core and/or a linear core, known as an E and I core. An E and I core positions layers of core material such that an E and I in juxtaposition takes an enclosed form and completes the form for the cycle of magnetic flux.

The thickness of the second winding 630 gives the linear transformer 600 high current carrying capabilities with minimal loss and is designed to carry 50A. A wire in this context is taken to mean any suitable material that may be used as a conductor.

In one embodiment, the second winding 630 is insulated from the first winding 620 using a suitable plastic. Alternatively, insulated wires may be used for the first and second windings 620, 630, and the insulation removed from the second winding 630 where contact is required with the carbon brush 655.

The position of the control arm 650 on the second winding 630, and thus the voltage at the output of the transformer 600, is controlled by the controller 200. The carriage 640 supporting the control arm 650 is moved by the motor 660 connected to the sliding mechanism 670. Alternatively a motor may be housed inside the carriage 670. The position of the control arm 650 on the second winding 630 sets the output voltage of the transformer 600 between an upper voltage limit and a lower voltage limit. Preferably the motor 660 is a stepper motor; however it should be appreciated that any suitable motor or any other suitable mechanism to control the position of the control arm 650 may be used.

Figure 3:
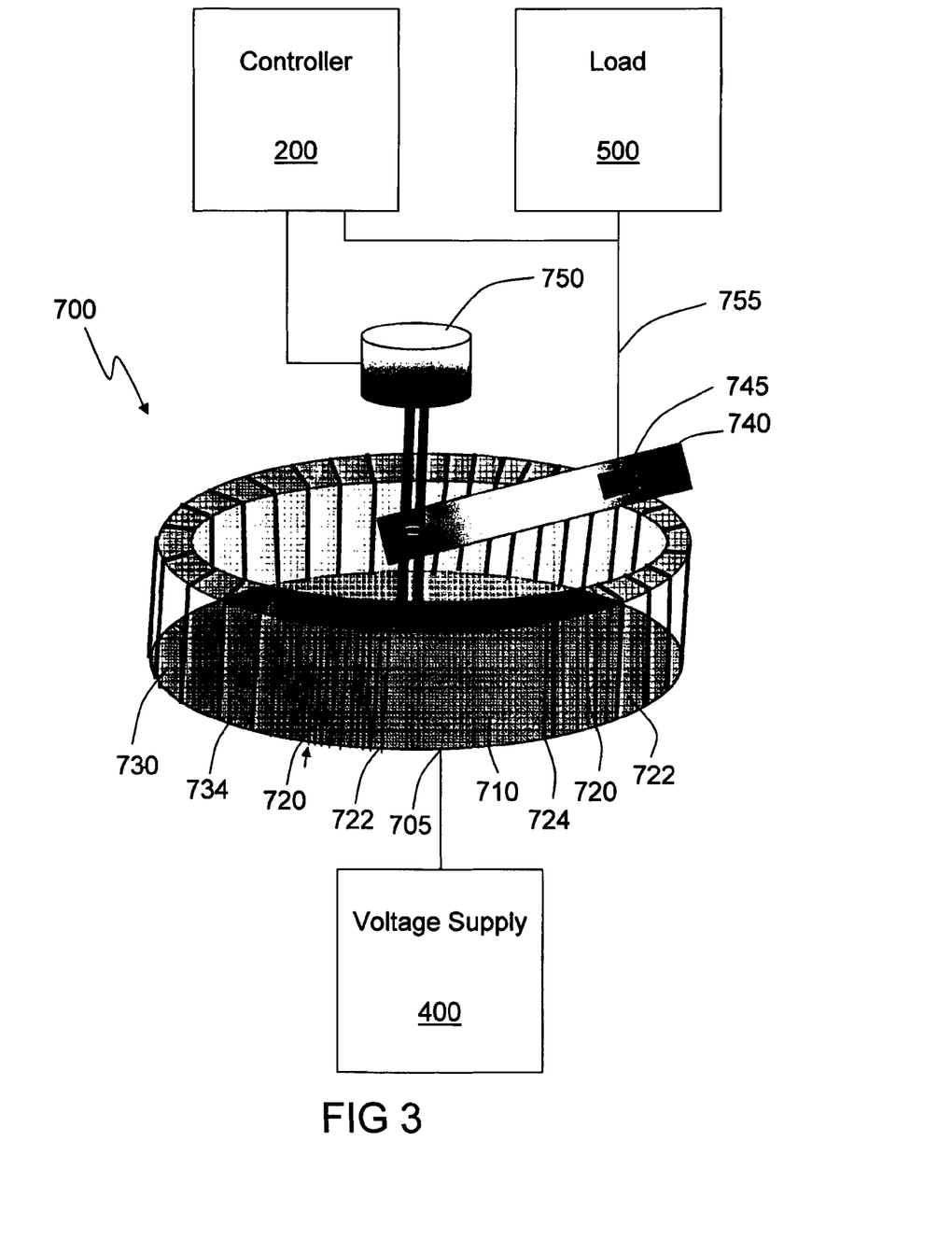
FIG. 3 is a partial cut-away perspective view of a toroidal transformer according to an embodiment of the present invention.

FIG. 3 shows a partial cut-away perspective view of a toroidal transformer 700 according to an embodiment of the present invention. Similar to the linear transformer 630, the toroidal transformer 700 includes a core 710, a first winding 720 including a first end 722 and a second end 724, a second winding 730 including a first end 732 and a second end 734, a control arm 740 and a stepper motor 750.

Similar to the linear transformer 600 of FIG. 2, the second end 724 of the first winding 720 is connected to first end 732 of the second winding 730.

In FIG. 3, the second winding 730 has been cut-away for clarity to show the first winding 720 under the second winding 730. In practice, the second winding 730 extends over the first and second ends 722, 724 respectively of the first winding.

The control arm 740 includes a carbon brush 745 for making contact with the second winding 730. An input 705 of the transformer 700 is connected at the first end 722 of the first winding 720 and the second end 734 of the second winding 730. An output 755 of the transformer 700 is connected between the carbon brush 745 and control arm 750 at any position of the second winding 730 and the first end 722 of the first winding 720.

The core 710 is an iron core and is toroidal in shape. A cross-section of the first winding 720 is smaller than a cross-section of the second winding 730. The first winding 720 is wound around the core 710 and the second winding 730 is wound over the first winding 720.

Similar to the linear transformer 600, in another embodiment only a single winding is used of the larger cross-section wire used to form the second winding 730. The first and second ends 732, 734 respectively of the second winding 730 define upper and lower position limits of the control arm 740.

In one embodiment, the first winding 720 is made from a wire of round cross-section, 1.6 mm in diameter, and the second winding 730 is made from a copper band of square cross-section with dimensions of 4.5 mm. However it should be appreciated that other wires of other suitable dimensions may be used. Similar to the linear transformer 600, the thickness of the second winding 730 gives the toroidal transformer 700 high current carrying capabilities with minimal loss and, in one embodiment, is designed to carry the necessary current it is designed for.

The second winding 730 is insulated from the first winding 720 using a suitable plastic. Alternatively, insulated wires may be used for the first and second windings 720, 730, and the insulation removed from the second winding 730 where contact is required with the carbon brush 745.

The output voltage from the toroidal transformer 700 is determined by a position of the control arm 740 and carbon brush 745 on the second winding 730 and is controlled by the motor 750 connected to the control arm 740. Similar to the linear transformer 600, the motor 750 is a stepper motor, however it should be appreciated that any suitable motor or any other suitable mechanism to control the position of the control arm 740 may be used.

In another embodiment, the first winding 620, 720 and the second winding 630, 730 do not overlap and are adjacent to each other along the length of a single core 610, 710. In this embodiment, the control arm 650, 740 of each type of transformer 600, 700 is prevented from contacting the first windings 620, 720, respectively as the first windings 620, 720 have a limited current carrying capacity. The control arm 640, 740 may be prevented from contacting the first windings 620, 720, respectively, either mechanically or electrically by the controller 200.

As previously described, the second winding 630, 730 of the linear and toroidal transformers 600, 700 is made from a copper band with a large cross-sectional area, thus the second winding 630, 730 has a higher current rating compared with a prior art transformer of the same physical size.

In addition, due to the larger cross-section of the wire, and the reduced number of turns of the second winding 630, 730, as the control arm 650, 740 passes from one winding turn to the next, there is a greater step in output voltage. However, many systems according to the present invention only need a reduced voltage range around the supply voltage. For example in a 230 Vac system, the transformer has a limited voltage range between 215 Vac and 240 Vac. Thus a voltage range of 0 Vac to 240 Vac is not required.

The output voltage range of the second windings 630, 730 depends on the ratio of the number of turns of the first winding 620, 720, and the number of turns of the second winding 630, 730 to the total number of windings.

A linear transformer, in one embodiment, and a toroidal transformer in another embodiment whose windings are wound on an iron core have been described, however it should be appreciated that other core materials may be used.

It should be appreciated that the transformer 600, 700 may take many other forms. In one embodiment core may be any suitable shape or form in order to conduct a magnetic field, for example the core may be made from a layered metal. In another embodiment, the transformer may be wound on an EI core to produce a 1:1 isolation or a voltage reduction/isolation system. In yet another embodiment, the first winding 620, 720 and the second winding 630, 730 may be wound on separate cores of any suitable shape for example EI, toroid or any other suitable form.

Figure 4:
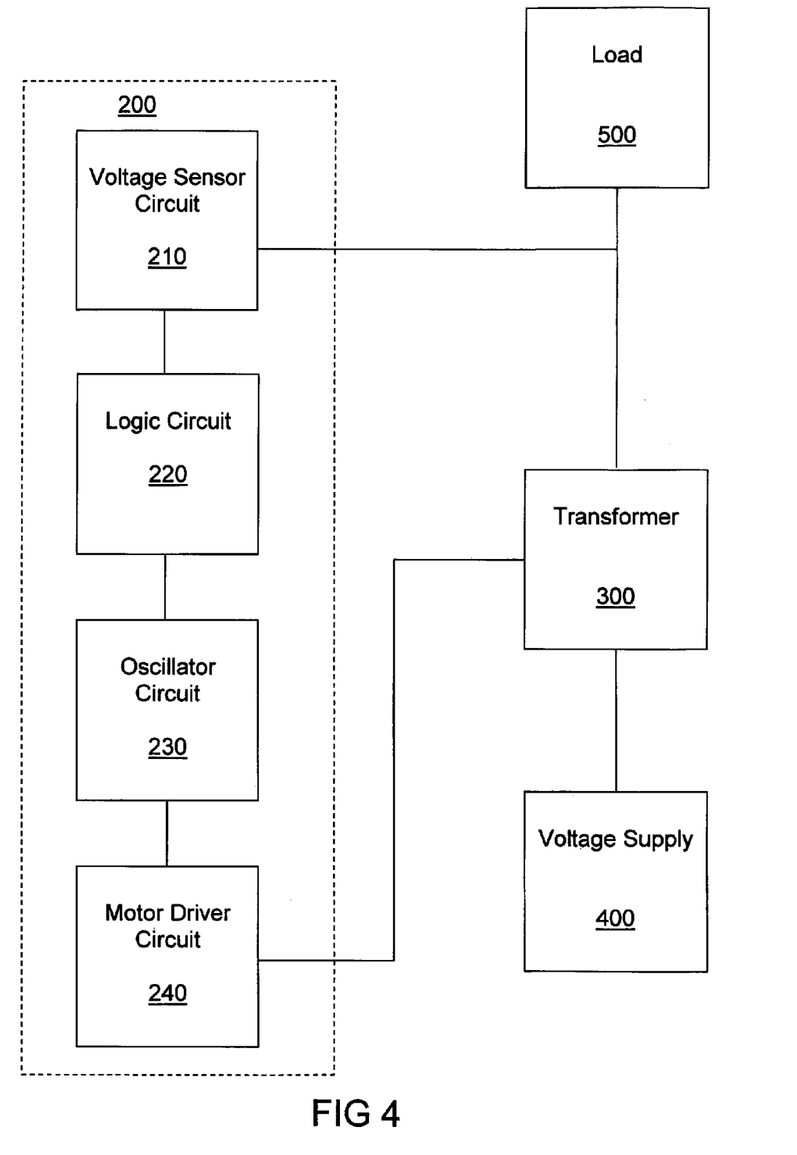
FIG. 4 is a block diagram illustrating a controller of FIG. 1 according to an embodiment of the present invention.

FIG. 4 shows a block diagram of the controller 200 according to an embodiment of the present invention. The controller 200 includes a voltage sensor circuit 210, a logic circuit 220, an oscillator circuit 230 and a motor driver circuit 240. Each circuit 210, 220, 230, 240 is powered by a power supply circuit (not shown), and may be derived from the output from the transformer 300 or from a separate power supply.

The voltage sensor circuit 210 monitors a voltage at the output of the transformer 300, and outputs signals to the logic circuit 220 when the voltage moves outside a voltage range defined by the upper voltage limit and the lower voltage limit. Outputs from the logic circuit 220 are connected to the oscillator circuit 230 which drive the stepper motor attached to the slider carriage of the transformer 300 via a motor driver circuit 240.

The voltage range is set below the supply voltage in order to reduce the power consumed by devices connected to the load. For example, the supply voltage may be 240 Vac and the desired output range may be set between 219 Vac and 225 Vac. By reducing the supply voltage to this range, the electrical power consumed from the supply is also reduced.

Figure 5:
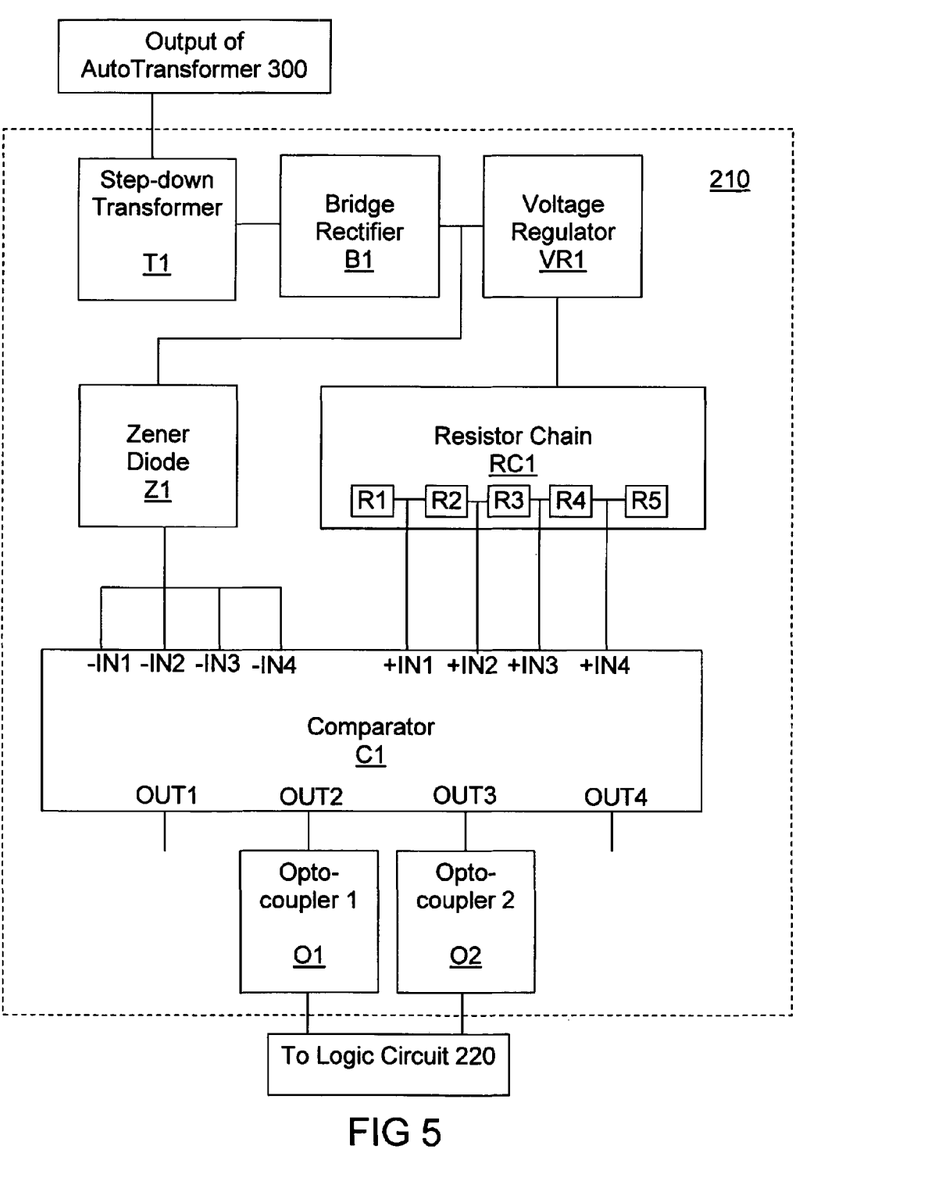
FIG. 5 is a block diagram illustrating a voltage sensor circuit of the controller of FIG. 4 according to an embodiment of the present invention.

FIG. 5 shows a block diagram of the voltage sensor circuit 200 of FIG. 4 according an embodiment of the present invention. The voltage sensor circuit 210 includes a step-down transformer T1 to reduce the voltage at the output of the transformer 300. Fluctuations in the voltage at the output of the transformer 300 are transferred at a lower voltage at the output of the step-down transformer T1 due to the fixed ratio. By monitoring the voltage supply via a transformer, any faults with the controller 200 may be repaired without interrupting supply to the load 500.

The output from the bridge rectifier B1 is connected to a zener diode Z1, for example a 12V zener diode such as a 1N4742. The output from the zener diode Z1 is connected to a comparator C1. In one embodiment, the comparator C1 is a quad comparator. However, it should be appreciated that only two comparators are required to monitor the lower voltage limit and the upper voltage limit. The extra comparators may be used to set a plurality of voltage limits which may be selected using switches or hard wired.

Furthermore, the extra comparators are required for visual calibration purposes and resistor chain buffering due to feedback from hysteresis resistors, connected from positive input to output, which aid sensitivity of all comparator outputs. As such, no end of chain comparator may be left disconnected from the resistor chain as it affects the balance of all comparators in the chain. Furthermore, hysteresis resistors may be altered, a decrease in resistance producing sharper responses and greater hysteresis resistance producing slower and lingering responses. Any combination of hysteresis resistors may also be used to effect the desired response from any one comparator output. One must have some skill to plan the desired effect.

The output from the zener diode Z1 is connected to each negative input −IN1, −IN2, −IN3, −IN4 of the comparator C1.

As is known in the art, when the voltage at a positive input is greater than the voltage at the negative input of a comparator, the output of that comparator is a floating logic level, but is usually pulled high with resistors (not shown) as in the present case. When the voltage at the positive input is less than the voltage at the negative input, the output is negative.

The output from the bridge rectifier B1 is also connected to a voltage regulator VR1 and the output from the voltage regulator VR1 is connected to a resistor chain RC1. In one embodiment, the voltage regulator VR1 is a 7812 whose output voltage is 12 Vdc. The resistor chain RC1 divides the output voltage from the voltage regulator VR1 (12 Vdc) into four reference voltages using resistors R1, R2, R3, R4, R5. R1 is connected to a 0V pin of the voltage regulator VR1 and R5 is connected to a 12 Vdc pin of the voltage regulator VR1. In a preferred embodiment, the resistors R1, R2, R3, R4, R5 have a tolerance of 1%, and the value of the resistors R1, R2, R3, R4, R5 is:

R1=36.4 kOhm
R2, R3, R4=4.3 kOhm
R5=71.6 kOhm

Using these values of resistor, together with a 15 Vac transformer T1 and a 12 Vdc voltage regulator, provides the following theoretical reference voltages to each comparator:

+IN1=3.61 Vdc
+IN2=4.04 Vdc
+IN3=4.47 Vdc
+IN4=4.89 Vdc

The reference voltages may vary due to factors such as hysteresis. Hysteresis may be improved by connecting a resistance (for example a 1 MOhm resistor (not shown)) between a positive input and a respective output of the comparator C1.

The reference voltages correspond to output voltages from the transformer 300 of approximately 207 Vac, 219 Vac, 225 Vac and 233 Vac for +IN1, +IN2, +IN3 and +IN4 respectively. The voltages at +IN1, +IN2, +IN3, +IN4 are tuned by connecting a suitable voltage meter to each positive input of the comparator +IN1, +IN2, +IN3, +IN4 in turn and adjusting resistors R1, R5. As such resistors R1, R5 are preferably variable resistors. The tuning process may need to be repeated several times in order to obtain the required voltages that correspond to the upper and lower voltage limits of the transformer 300.

Once the tuning process has been completed, OUT1 is low when the output voltage of the comparator is greater than 207 Vac. OUT2 is low when the output voltage of the comparator is greater than 219 Vac. OUT3 is low when the output voltage of the comparator is greater than 225 Vac and OUT4 is low when the output voltage of the comparator is greater than 233 Vac.

Any two of the outputs OUT1, OUT2, OUT3, OUT4 may be chosen to set the lower voltage limit and upper voltage limit and drive the motor of the transformer 300 in a clockwise or an anticlockwise direction. In the present embodiment, OUT2 and OUT3 have been chosen, such that the output voltage of the transformer 300 is increased when the voltage is below 219 Vac and decreased when the voltage is above 225 Vac. However it should be appreciated that any voltage range may be set by changing the values of resistors R1, R2, R3, R4, R5.

The chosen outputs OUT2, OUT3 of the comparator may be connected to an output buffer (not shown) before being connected to a pair of optocouplers O1, O2.

The outputs OUT1, OUT2 drive the stepper motor of the transformer 300 via the logic circuit 220, the oscillator circuit 230 and the motor driver circuit 240.

It should be appreciated that there are many designs of voltage sensor circuit. For example, a voltage sensor circuit may include an analogue to digital converter connected to a microcontroller or microprocessor which may be substituted for the comparator. The microcontroller may directly read a value of the voltage at the output of the transformer 300 via the transformer T1 and also control the stepper motor.

The logic circuit 220 provides two logic signals to the oscillator circuit 230 to drive the motor in a clockwise or an anticlockwise direction.

A first oscillator is connected to respective terminals of the stepper motor to drive it in a clockwise direction, and a second oscillator provides signals to drive the motor in an anticlockwise direction. The motor moves the control arm on the transformer thus adjusting the output voltage of the transformer between the lower limit and the upper limit.

The pulsed outputs of the oscillator circuit 230 are connected to the motor driver circuit 240. The motor driver circuit 240 includes transistors which are switched by signals from the oscillator circuit 230 to provide the necessary current to the stepper motor.

It should be noted that each circuit 220, 230, 240 may be decoupled using optocouplers. Furthermore, the switching speed of the optocouplers may be increased by providing MOSFETS at the output of the optocouplers as is known in the art. The optocouplers limit the amount of interference between each circuit 210, 220, 230, 240, and also isolate the circuitry further from the supply voltage.

A person skilled in the art will appreciate that the MOSFETS may be replaced with BJT transistors. However for power switching, MOSFETS are preferable, as no current is consumed from the optocoupler, just an applied voltage which is much more efficient. The MOSFET is needed when the optocoupler cannot supply enough current (a 30 mA limit), whereas the MOSFET can handle 500 mA, which is sufficient to turn on the oscillators, failsafe circuitry and power fail warning systems.

The control circuit 220 may also include a fail safe circuit. The fail safe circuit monitors the voltage output from the voltage regulator VR1, and if the voltage is cut or reduced by a certain amount, power supplying the oscillator circuit 230 is interrupted, thus the control arm of the transformer 300 cannot move, and is prevented from moving ambiguously or from resulting in false logic being supplied to the oscillator circuitry.

In summary, the present invention allows a voltage supplied to a load to be reduced in order to save power. Apart from reducing the cost to a consumer, the present invention reduces the impact on the environment and the strain on power infrastructure.

Figure 6:
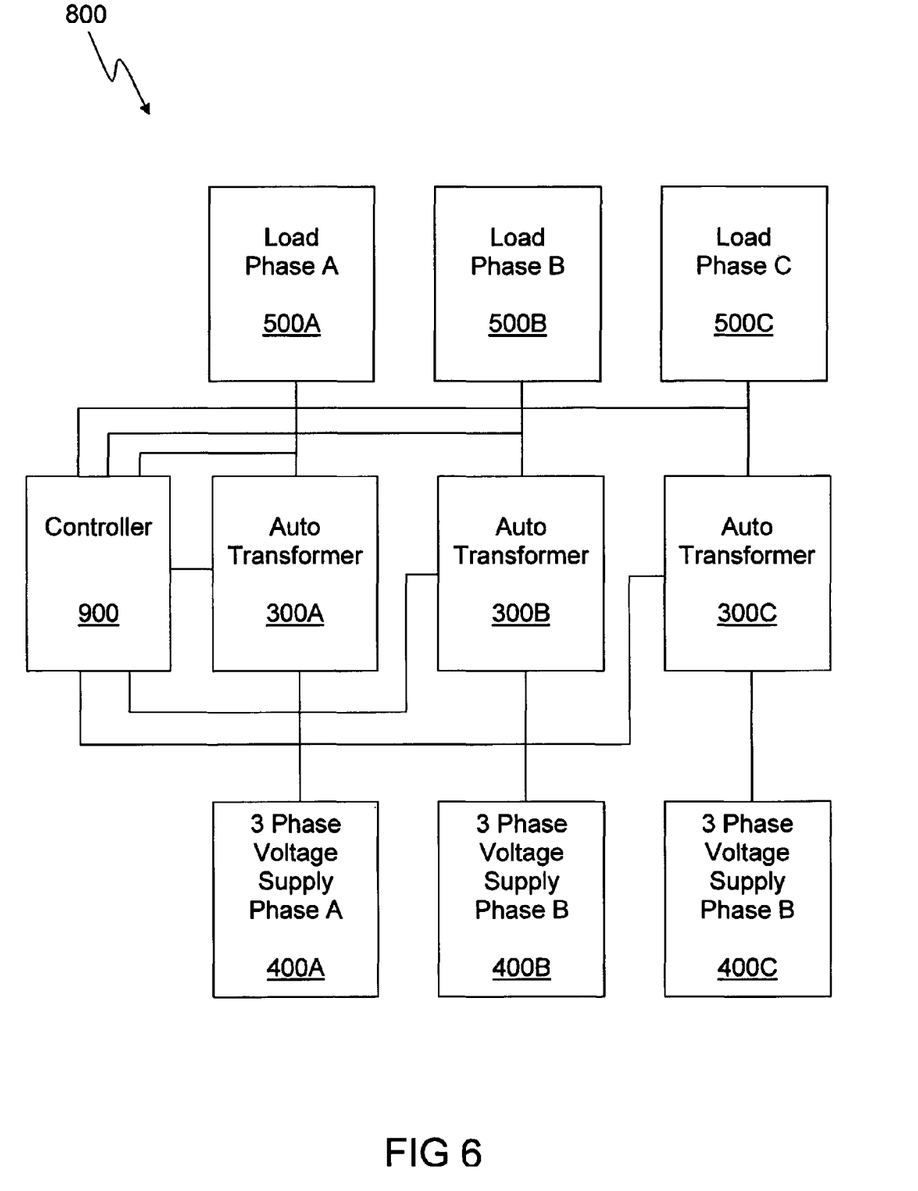
FIG. 6 is a block diagram illustrating a system for reducing power consumption in a three phase power supply circuit according to a second embodiment of the present invention.

It should be appreciated that although one embodiment has been described in relation to a single phase supply, it should be appreciated that the present invention may be applied to a three-phase supply as shown in FIG. 6.

FIG. 6 shows a system 800 for reducing power consumption in a three phase power supply circuit according to a second embodiment of the present invention. The system 800 includes three transformers 300A, 300B, 300C connected to respective phases 400A, 400B, 400C of a three phase supply. A controller 900 independently measures and controls an output voltage of each respective transformer 300A, 300B, 300C to each respective load 500A, 500B, 500C, between an upper voltage limit and a lower voltage limit.

In many possible embodiments, the construction of single phase systems of great output power and variation is possible with this invention by stacking together the basic system as such in a series of blocks with suitable cable interconnections effecting power and control. As well, any form of three phase system may be constructed by stacking suitable basic blocks (in "lego type") together to provide a system of great output power and variation by using suitable interconnecting cabling. Due to the infinite variation of designs possible, we say that this basic invention has unique and novel construction attributes not found in any other system of prior art. As well, the modular form allows for ease of transport and installation even in restrictive areas of space.

Furthermore, although the invention has been described in relation to a 230 Vac supply voltage 400, it should be appreciated that the present invention may be applied to any suitable supply voltage such as 110 Vac, as used in the United States and 100 Vac as used in Japan or any suitable frequency, for example 50 Hz or 60 Hz. Furthermore, the present invention may be applied to Direct Current (DC) systems.

In some installations, the voltage supplied to a remote device connected to the load 500 may fall below the voltage limit or below a critical level that is required to allow the device to operate correctly. The excessive voltage drop may be due to sub-standard cabling connected to the device or due to a long cable run.

In these instances, a remote telemetry unit may be used to monitor the voltage supplied to the remote device. However it should be appreciated that it may not be used, for example when the volt drop is too great, in which case the upper and lower voltage limits may be manually set/adjusted by measuring a voltage at the load and calculating the volt drop.

Figure 7:
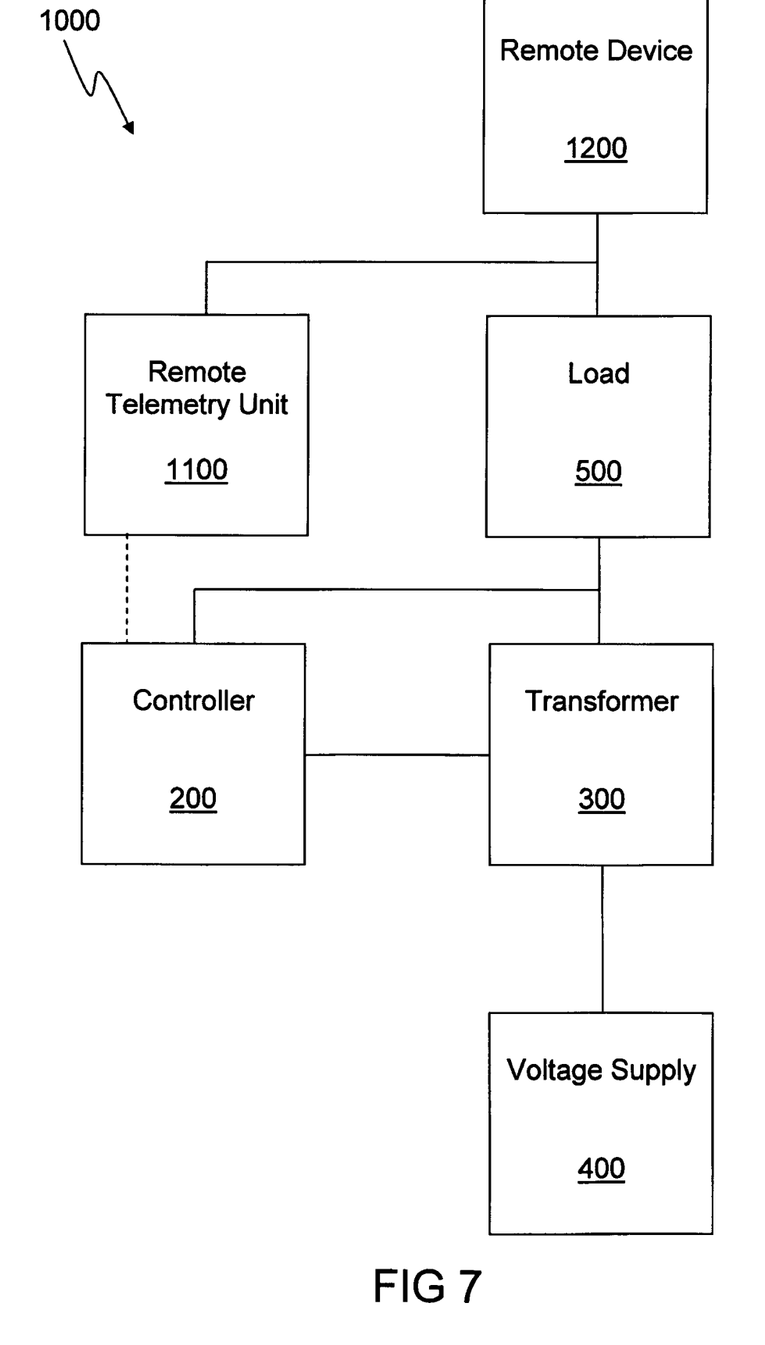
FIG. 7 is a block diagram illustrating a system for reducing power consumption including a remote telemetry unit according to an embodiment of the present invention.

FIG. 7 is a block diagram illustrating a system 1000 for reducing power consumption including a remote telemetry unit 1100 according to an embodiment of the present invention. The system 1000 is identical to the system 100 of FIG. 1, except that a remote telemetry unit 1100 monitors a voltage at a power outlet supplying the remote device 1200 connected to the load 500. The remote telemetry unit 1100 signals to the controller 200 if the voltage at the power outlet supplying the remote device 1200 falls below the lower voltage limit. If the voltage supplying the remote device 1200 falls below the lower voltage limit, the controller 200 increases the voltage output from the transformer 300. The voltage at the power outlet may be monitored using a circuit similar to the voltage sensor circuit 210 of FIG. 5.

The optional remote telemetry unit 1100 may communicate with the controller 200 using a cable, mains signalling, wireless communication or any other suitable mechanism.

Systems of the present invention may be combined with capacitors connected across the supply circuit sized appropriately for the application. The resulting system can automatically reduce power consumption, and also corrects for phase angle and consequently power factor, providing a holistic power conditioning system.

Embodiments of the present invention can provide a highly precise, prescribed range of output voltage to an electrical load of a property. This is accomplished by compensating for external fluctuations in a supply voltage. These external fluctuations cannot be predicted and, if particularly volatile, can represent a considerable concern for energy reduction solutions and the presence of internal voltage drop.

Furthermore, internal voltage drop on the load is a concern when prescribing energy reduction solutions. Voltage drop is nearly always present in some form, whether minor or serious, and should be compensated for where possible.

The present invention compensates entirely for external voltage fluctuations in the electrical supply, and further compensates for internal voltage drop caused by certain loads through automatic voltage adjustment individually between phases.

Further, embodiments of the present invention alleviate inherent problems associated with implementing prior art technology. Also, the present invention does not create a disruption in the electrical supply, unlike traditional break-before-make technologies such as SCRs etc. The present invention does not create a break in the sine wave at any time, preventing electrical glitches and gaps. In addition, the present invention prevents surges inherent to a break-before-make design. In addition, the controller and motor may be maintained or removed without the need to interrupt the supply to the load.

Additionally, embodiments of the present invention are generally significantly less expensive than comparably sized variacs, and are smaller and significantly lighter, making the technology far more versatile and applicable. In comparison to electronic switching technology to drive a tapped transformer, such as Silicon Controlled Rectifiers, the present invention is substantially cheaper and far more effective at delivering stable output power.

Moreover, the present invention may be applied to both single-phase and three-phase systems. In the case of three-phase systems, each individual phase is adjusted separately from the others to balance independent load characteristics that may be present on each individual phase. This maximises the opportunity for greater energy savings, and eliminates the inefficiencies inherent with locking all three phases, and consequently the output voltages, together.

Further benefits of the present invention include the modular method of construction and installation. Each system may be a standard, applicable size and power rating appropriate for the site requirements. This standardisation allows for easy manipulation of units into nearly any size, configuration and setup. This modular method of construction and installation allows an installer to avoid many of the difficulties experienced with the prior art, most notable of which are the substantial size and weight of comparably rated E and I torroidal transformer systems which may or may not include one or more variacs.

The modularity of the design is achieved by connecting the transformers in parallel in order to increase a power rating of the system, which has the effect of amplifying the magnetic field produced in the transformer, and in order to match the load.

Figure 8:
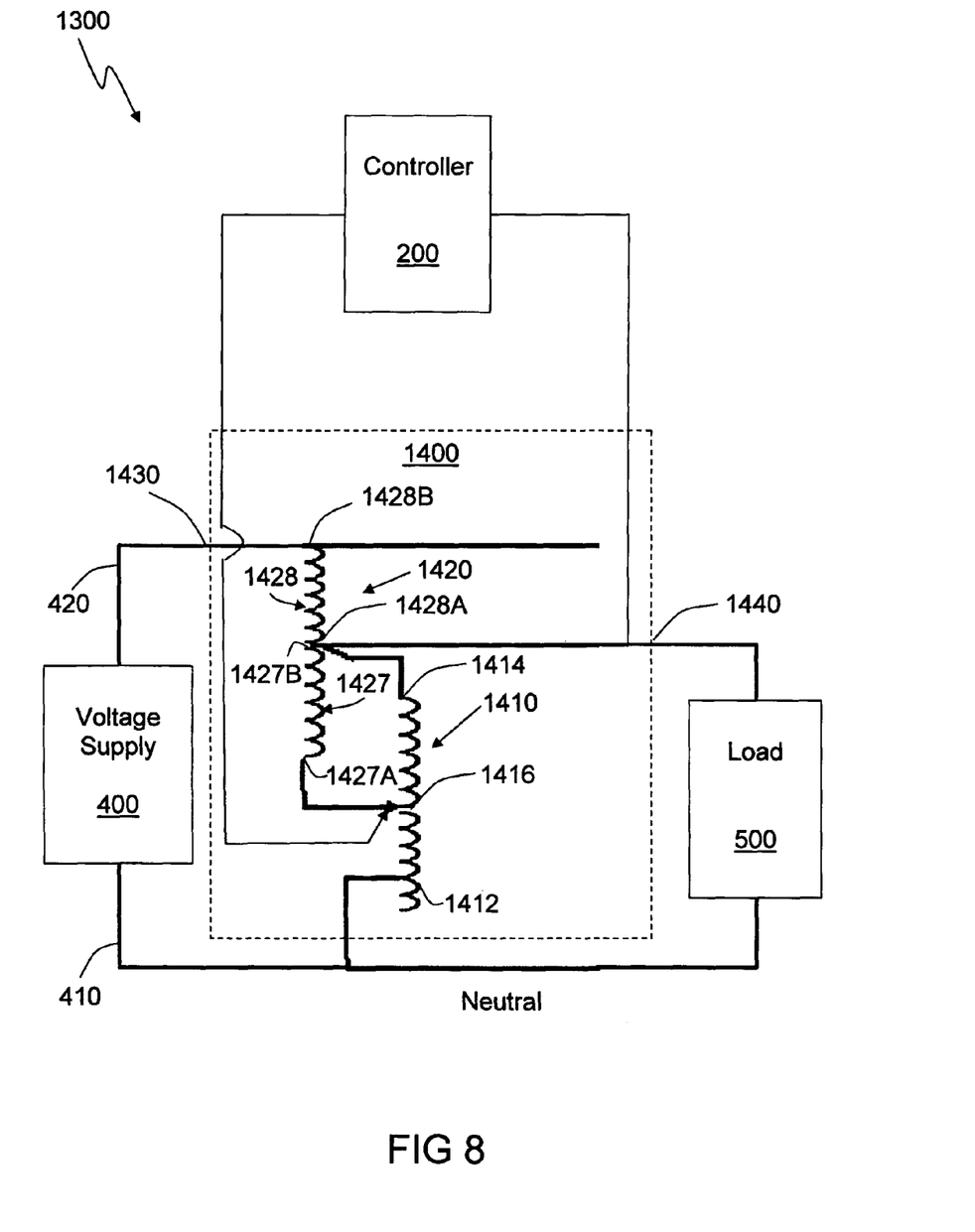
FIG. 8 is a block diagram showing a system 1300 for reducing power consumption in a power supply circuit, according to a further embodiment of the present invention.

FIG. 8 is a block diagram showing a system 1300 for reducing power consumption in a power supply circuit, according to a further embodiment of the present invention. Similar to the embodiments shown in FIGS. 1-3, the voltage control system 1300 includes a controller 200 connected to a transformer 1400. An input 1430 of the transformer 1400 is connected to a voltage supply 400. An output 1440 of the transformer 1400 is connected to a load 500, such as a circuit breaker box of a house or factory. The controller 200 monitors an output voltage of the transformer 1400 and adjusts the output voltage to within an upper voltage limit and a lower voltage limit. For a 230 Vac supply, the output voltage may be adjusted to between a no load lower voltage limit of 220 Vac and a no load upper voltage limit of 260 Vac.

In this embodiment, the transformer 1400 includes a variac 1410 and a second transformer 1420. The variac 1410 and the second transformer 1420 may have either linear, toroidal, E and I or any other suitable cores.

The variac 1410 includes a winding wrapped around the core. The winding includes a first end 1412 and a second end 1414. An output 1416 of the variac 1410 includes a carbon brush (not shown) for making contact with the winding of the variac 1410. A position of the carbon brush is controlled by a motor (not shown) and the motor is controlled by the controller 200.

In one embodiment, the second transformer 1420 is an autotransformer and includes a winding wound around a core. It should be appreciated that the second transformer 1420 may be any suitable transformer, for example an isolating transformer (such as an E and I transformer or a toroidal transformer), an autotransformer, or any other suitable transformer that has a suitable power rating.

The second transformer 1420 includes a first winding 1427 including a first end 1427A and a second end 1427B of a first wire wound on the core. The second transformer 1420 also includes a second winding 1428 including a first end 1428A and a second end 1428B of a second wire. The core of the second transformer 1420, the first winding 1427 and the second winding 1428 form part of the transformer 1400. The second wire has a larger cross-section than the first wire.

The second end 1427B of the first wire is connected to the first end 1428A of the second wire. The connection between the first winding 1427 and the second winding 1428 also forms the output 1440 of the transformer 1400. It should be appreciated that the first and second windings may be wound on the same or separate cores.

In one embodiment, the cross-section or cross-sectional area of the first wire of the first winding 1427 is 4 mm$^2$, and the cross-section or cross-sectional area of the second wire of the second winding 1428 is 20 mm$^2$. However it should be appreciated that the cross-section may be varied to suit a particular power requirement.

The variac 1410 and the second transformer 1420 are connected as follows. The second end 1414 of the winding of the variac 1410 is connected to the junction of the first winding 1427 and the second winding 1428 of the second transformer 1420 which also forms the output 1440 of the transformer 1400. The output 1416 of the variac 1410 is connected to the first end 1427A of the winding 1427 of the second transformer 1420.

The supply voltage 400 is connected between the first end 1412 of the winding of the variac 1410 and the second end 1428B of the second winding 1428 of the second transformer 1420. In particular, a neutral line 410 of the supply voltage 400 is common and connected to the first end 1412 of the winding of the variac 1410 and the load 500. An active line 420 (or live line) of the supply voltage 400 is connected to the second end 1428B of the second winding 1428 of the second transformer 1420.

The load 500 is connected between the neutral line 410 and the output of the transformer 1400 formed at the connection between the first winding 1427 and the second winding 1428 of the second transformer 1420 and the second end 1414 of the winding of the variac 1410.

The winding of the variac 1410 is wound using a smaller gauge wire than the winding of the second transformer 1420. Typically, the winding of the variac 1410 is between one-tenth and two-thirds of the size of the winding of the second transformer 1420. In operation, the controller 200 monitors a voltage at the output 1440 of the transformer 1400 and controls the position of the carbon brush on the variac 1410 at the output 1416 of the variac 1410 so that a voltage at the output 1440 of the transformer 1400 is maintained at a chosen level, typically at 220 Vac. As the carbon brush moves towards the first end 1412 of the winding of the variac 1410, the voltage at the output 1440 of the transformer 1400 falls. As the carbon brush moves towards the second end 1414 of the winding of the variac 1410, the voltage at the output 1440 of the transformer 1400 increases.

The number of turns on the variac 1410 and the second transformer 1420 are chosen such that when the carbon brush of the variac 1410 is at a minimum position at the first end 1412 of the winding of the varaic 1410, the voltage at the output 1440 of the transformer 1400 is at a minimum voltage. Similarly when the carbon brush of the variac 1410 is at a maximum position at the second end 1414 of the winding of the variac 1410, the voltage at the output 1440 of the transformer 1400 is at a maximum voltage. The minimum and maximum voltages at the output 1426 of the second transformer 1420 are chosen to be, for example, between 220 Vac and 260 Vac. Thus the variac 1410 controls the voltage at the output 1440 of the transformer 1400 to have a spread of 40 Vac only.

In addition, capacitors (not shown) may be connected across the load 500 in order to improve the power factor and thus reduce a phase angle for some applications. Alternatively, these capacitors may also be connected across the supply voltage 400.

In summary, some advantages of a system of the present invention include:
1) The system automatically reduces a voltage supplied to a load to within predetermined limits in order to save power and reduce the cost;
2) The system reduces the strain placed on the electricity network;
3) The system may independently control each phase of a three phase power supply;
4) The system may monitor voltages at any location on a load circuit, and increase the voltage should the voltage fall below the lower voltage limit;
5) As the voltage measurements are performed on a low voltage side of the supply voltage circuit, any repairs to the controller may be performed without interrupting power to the load; and
6) The design of the transformer is smaller, slighter and cheaper to produce, than prior art variacs of the same electrical specification.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A system for reducing power consumption in a power supply circuit including:
   a variable autotransformer including a winding having a first end and a second end, wherein an output of the variable autotransformer is positioned between the first end and the second end of the winding;
   a second transformer including:
      a core;
      a first winding including a first end and a second end of a first wire wound on the core;
      a second winding including a first end and a second end of a second wire, wherein the second wire has a larger cross-section than the first wire and the second end of the first wire is connected to the first end of the second wire;
      an input at the second end of the second winding for connecting to the power supply circuit; and
      an output at a junction of the first and second windings for connecting to a load; and
   a controller for variably controlling an output voltage at the output of the second transformer, wherein the output voltage is less than a supply voltage at the input, to reduce the power consumption of the load;
   wherein the second end of the winding of the variable autotransformer is connected to the junction of the first and second windings of the second transformer, and the output of the variable autotransformer is connected to the first end of the first winding of the second transformer.

2. The system of claim 1 wherein the second end of the second winding of the second transformer is connected to an active line of the power supply circuit.

3. The system of claim 1 wherein the core is an iron core.

4. The system of claim 1 wherein the core is linear in shape.

5. The system of claim 1 wherein the core is toroidal in shape.

6. The system of claim 1 wherein the core is an E and I core.

7. The system of claim 1 wherein the second winding of the second transformer is on a same core as the first winding of the second transformer.

8. The system of claim 1 wherein the controller includes a voltage sensor circuit for detecting a voltage at the output of the second transformer.

9. The system of claim 8 wherein the voltage sensor circuit includes one or more comparators for comparing a voltage at the output of the second transformer to the upper voltage limit and the lower voltage limit.

10. The system of claim 1 wherein the system further includes a remote sensor circuit connected to the controller, for monitoring a voltage at a remote device connected to the load.

11. The system of claim 1 wherein the controller adjusts the output voltage of the second transformer such that the voltage at the remote device is between a lower voltage limit and an upper voltage limit.

* * * * *